Jan. 31, 1961  F. G. REUTER  2,969,656
COUPLING DEVICE
Filed Dec. 15, 1958

INVENTOR.
FRANZ GOTTFRIED REUTER
BY Clelle W. Upchurch and
Donald E. Gilliham
ATTORNEY United States Patent Office 2,969,656
Patented Jan. 31, 1961

2,969,656

COUPLING DEVICE

Franz Gottfried Reuter, Lemforde, Hannover, Germany, assignor, by mesne assignments, to Mobay Chemical Company, Pittsburgh, Pa., a corporation of Delaware Filed Dec. 15, 1958, Ser. No. 780,289

Claims priority, application Germany Dec. 14, 1957

8 Claims. (Cl. 64—11)

This invention relates to a coupling device and, more particularly, to an improved flexible coupling device adapted to connect machine and structural elements together.

It has been known heretofore to provide flexible coupling devices in a wide variety of designs. Such flexible coupling devices have been used to flexibly connect machine elements, such as, power transmitting shafts, as well as static structures, such as, motor mounts between an automobile engine and frame, and the like. The heretofore known flexible coupling devices have usually comprised a rubber-metal or a textile reinforced rubber-metal combination whereby the rubber and metal are joined by a vulcanization process. The natural or synthetic rubber used in the heretofore known coupling devices are, however, subject to degradation by prolonged exposure to weather and such materials as oil and the like. Moreover, natural or synthetic rubber has but a limited range of elastic properties, thus limiting design criteria.

Elastic rubber-like polyurethanes having excellent degradation resistance, wearability, and a wide range of improved elastic properties have also heretofore been known. However, at the present state of the art, polyurethane elastomers cannot be made to form an adhesive bond with metal. In other words, it is presently impossible to vulcanize polyurethane elastomers to metal as it is possible to vulcanize natural or synthetic rubber to metal. However, polyurethane coupling devices of special design have been provided between machine elements. For example, a flexible polyurethane coupling device has been provided between power transmitting shafts which is provided with alternating bolt-receiving holes to connect the mating flange of a driving shaft and a driven shaft, respectively. Also a polyurethane coupling device having rigid spaced-apart reinforcing elements cast in the coupling which are adapted to receive bolts connecting respective mating flanges of power transmitting shafts have been provided. The coupling devices referred to are disclosed in copending United States patent applications, Serial Numbers 749,484 and 733,735, respectively, and are assigned to the same assignee as the present application.

It is, therefore, a primary object of the invention to provide an improved coupling device for flexibly connecting machine elements and static structures. It is another object of the invention to provide a coupling device having an improved flexibility and vibration dampening characteristics. Still another object of the invention is to provide improved economical coupling devices which may be readily and easily installed. A further object of the invention is to provide an improved composite preassembled coupling device.

Other objects will become apparent to those skilled in the art from the following detailed description of the invention and with reference to the accompanying drawing in which.

Figure 1:
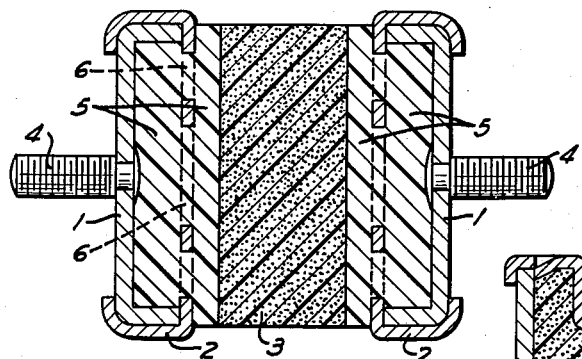
Figure 1 is a cross-sectional view of one preferred embodiment of the invention.

The above objects and others are accomplished, generally speaking, in accordance with the invention by providing spaced-apart metal supports each of which partially encloses a unitary body of a polyurethane plastic. The unitary body of polyurethane plastic comprises three distinct areas or portions, two portions of which are partially enclosed by the spaced-apart metal supports and the flexible central area or portion which is not enclosed and thus provides the flexibility for the coupling device. Generally speaking, the two metal supports for the coupling device have a "cage-like" structure which is filled by a polyurethane castable melt during the manufacturing operation. The cage-like portion may be of any design which partially encloses the polyurethane plastic body but yet is sufficiently open so that the polyurethane plastic is a unitary structure through the three portions; that is, the two partially enclosed portions and the flexible central portion. The term "cage-like" structure, therefore, as herein used denotes any structure capable of providing sufficient mechanical anchorage for the unitary polyurethane plastic body.

The "cage-like" structures themselves may be designed in a wide variety of ways. It is only important that the metal support be constructed in such a way as to provide a constricted area so that the polyurethane plastic body may be cast from a liquid castable melt into and around said constricted area and to provide sufficient free area so that the polyurethane plastic body partially enclosed inside the cage-like structure is in structural unity with the central flexible portion. For example, the metal support may comprise a relatively flat hollow member with holes provided in the side which is toward the central flexible portion into which the plastic may enter during the casting process. The metal supports may also comprise a cup-shaped metal member with the open end towards the central flexible connecting portion if the cup-shaped member is provided with inwardly disposed indentations in the sides of the cup. In addition, centrally disposed internally mounted cage-like members may be provided, such as, solid or perforated discs.

The coupling device may assume any suitable cross-sectional shape when taken in a plane through, or parallel to, the metal supports. Suitable cross-sectional shapes are, for example, square, round, and rectangular.

The polyurethane plastic portions of the coupling device provided by the invention may be formed from any suitable elastic porous or nonporous rubber-like polyurethane. Porous rubber-like polyurethanes have exceptionally good vibration dampening characteristics and are prepared like a nonporous polyurethane except that the product is cross-linked with a minor amount of water which evolves carbon dioxide when reacted with an isocyanate group, so that the polyurethane plastic contains a great number of extremely fine pores or voids. A nonporous rubber-like polyurethane may be prepared by reacting any suitable organic polyisocyanate with any suitable organic compound having reactive hydrogen atoms and capable of reacting with the isocyanate group to form a polyurethane. For example, 1,5-naphthalene diisocyanate, paraphenylene diisocyanate, 4,4'-diphenyl dimethylmethane diisocyanate, or p,p'-diphenylmethane diisocyanate may be reacted with a polyester, polyalkylene ether glycol, polythioether glycol, or the like, having terminal groups which are predominately hydroxyl groups and a molecular weight of at least about 750 and the resulting product may be cross-linked with any suitable organic chain extender or cross-linker. Suitable cross-linking agents include ethylene glycol, diethylene glycol, butanediol, diprimary aliphatic and aromatic diamines, such as, toluene diamine, and the like. To provide a porous polyurethane elastomer, a small amount of water is included or added as a cross-linker. Indeed, any organic compound having reactive hydrogen atoms, organic polyisocyanates, and cross-linker disclosed in United States Patents 2,621,166; 2,620,516; and 2,729,618; may be used in forming the polyurethane and any of the processes disclosed in these patents may be followed in making a polyurethane suitable for shaping the coupling device of the invention. Usually, the coupling device will be formed by pouring a molten polyurethane melt in a suitable mold in and about the spaced-apart metal supports. The entire contents of the mold will then be heated until cross-linking and curing has been obtained with solidification of the polyurethane into a relatively hard but flexible rubber-like product having the shape of the mold.

It is preferred in one embodiment of the invention to provide the polyurethane plastic body from a combination of a suitable porous and a nonporous polyurethane plastic. In this embodiment a non-porous polyurethane plastic is first cast into the metal supports and around the cage-like structure as hereinbefore defined to form the two portions which are partly enclosed by the cage-like structure of the spaced-apart metal supports. The central flexible area is subsequently cast of a suitable porous polyurethane plastic. The porous polyurethane plastic will form a suitable adhesive bond with the nonporous polyurethane plastic previously solidified.

The coupling device provided by the invention has been found to be admirably suitable for a variety of uses where a flexible connection between machine elements and static structures is desirable, for example, as motor mounts, as well as a coupling device between power transmitting shafts and the like.

Referring again to the drawing for a more detailed description of the several embodiments, Figure 1 illustrates one preferred embodiment of the coupling device of the invention. The unitary polyurethane plastic body is composed of three distinct parts. The two end parts which are partially enclosed by the cage-like structure comprises a nonporous polyurethane plastic 5 having a Shore A hardness of from about 60° to about 90° and an elasticity of from about 30% to about 60%. The central flexible portion is a porous polyurethane plastic 3 having a density of from about 80 kilograms per cubic meter to about 600 kilograms per cubic meter and resiliency of from about 40% to about 65%. The cage-like structure of the metal support in Figure 1 comprises a U-shaped base plate which is provided with an attachment or assembling means 4. The base plate 1 has been telescoped inside a U-shaped structure 2, and the open ends of the U-shaped structure 2 are crimped about the exterior of the base plate 1. The U-shaped structure 2 has a plurality of openings 6 adapted to receive a castable polyurethane melt forming the nonporous polyurethane plastic 5, thus a cage-like structure is formed comprising a relatively flat hollow member with openings provided in the side which is toward the center flexible portion 3.

Figure 2:
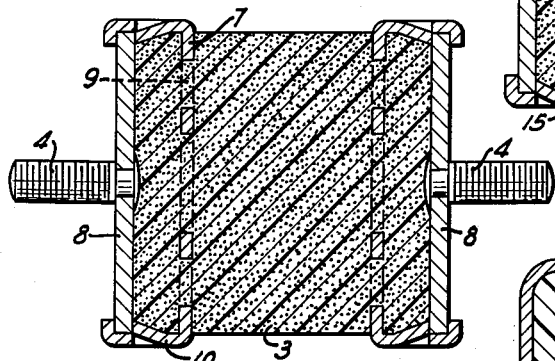
Figure 2 is a cross-sectional view of another embodiment of the invention.

Figure 2 represents still another embodiment of the invention in which the entire unitary polyurethane plastic body comprises a porous polyurethane plastic 3. The cage-like member comprises a base plate 8 onto which is crimped an opposing U-shaped plate 7 having openings 9 therein. thus providing a pair of spaced-apart plates with the plate towards the central flexible area containing opening through which the porous polyurethane plastic communicates from the partially enclosed portions to the central flexible portion. The spaced-apart plates are maintained in spaced relation by a plurality of spaced depressions 10 in the U-shaped plate 7.

Figure 3:
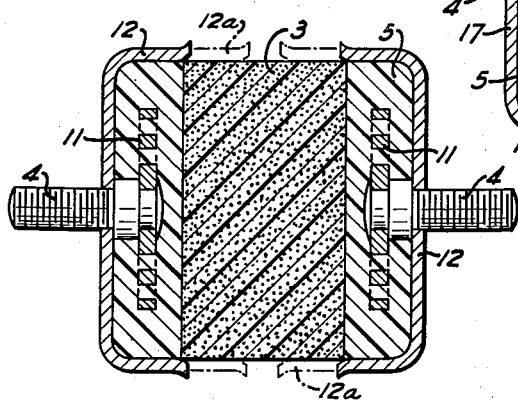
Figure 3 is a cross-sectional view of still another embodiment of the invention.

Figure 3 illustrates a further embodiment of the invention in which the partially enclosed areas comprise a nonporous polyurethane plastic 5 and the central flexible portion comprises a porous polyurethane plastic 3. The metal support comprises an open cup-shaped member 12 which may be extended over the central flexible portion as shown by 12–a in dotted lines to further increase the rigidity of the coupling device. This modification is of particular advantage when the coupling device is to be used between power transmitting shafts, and the like. The cage-like structure shown in Figure 3 comprises a perforated plate or disc 11 which is centrally disposed and integrally attached to the attachment member 4.

Figure 4:
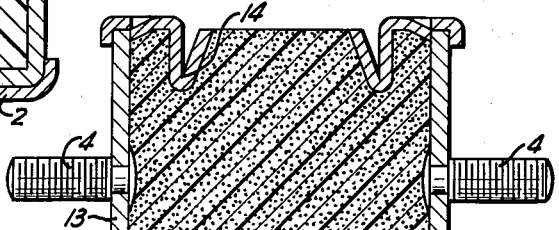
Figure 4 is a cross-sectional view of a further embodiment of the invention.

Figure 4 illustrates still another embodiment of the invention in which the unitary polyurethane plastic body comprises a porous polyurethane plastic 3. The cage-like structure comprises a plate 13 onto which is crimped a metal member 14 having deep indentations therein towards the center of the coupling device. The element 14 is held securely in place by a plurality of special indentations 15.

Figure 5:
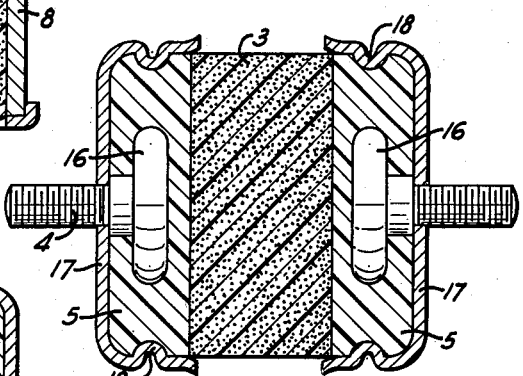
Figure 5 is a cross-sectional view of a still further embodiment of the invention.

Figure 5 illustrates a still further embodiment of the invention in which the unitary polyurethane plastic body comprises a nonporous polyurethane plastic 5 in the partially enclosed end portions and a porous polyurethane plastic 3 in the central flexible portion. The cage-like structure comprises a cup member 17 having indentations 18 along the sides thereon in combination with a centrally disposed disc or plate member 16 which is integrally attached to the attachment member 4.

While not specifically illustrated, it is obvious that the polyurethane plastic body may consist entirely of a nonporous polyurethane plastic. Likewise, such other obvious modifications are intended to be included in the scope of the invention.

The following examples illustrate the preparation of a nonporous and a porous polyurethane plastic suitable for forming the coupling device provided by the invention.

*Example 1*

1,000 parts by weight of an hydroxyl polyester obtained by thermal esterification of about 11 mols of adipic acid with about 12 mols of ethylene glycol and having an hydroxyl number of about 52 and an acid number of about 1 are heated to a temperature of about 135° C. and under a vacuum of about 12 mm. until the formation of bubbles has stopped and the polyester is completely free from water. Now, 180 parts by weight of naphthalene-1,5-diisocyanate are added at 135° C. to the dehydrated polyester while stirring. As soon as the temperature starts to drop, 20 parts by weight of butylene glycol-1,4 are stirred into the mixture at about 135° C. The resulting mixture is poured into a suitable mold. This has been so designed that the metal support may be inserted in the mold in properly alined relation and the polyurethane is cast thereabout and solidified by curing. The above mixture is maintained in the mold at a temperature of about 110° C. for about 24 hours to form a homogeneous polyurethane rubber. After 24 hours the coupling device is removed from the heating chamber and the material then shows the following properties: The Shore A hardness 60°, resiliency 50%, elongation 500%.

*Example 2*

About 1.5 kilograms of a polyester prepared by esterification of adipic acid and ethylene glycol and having an OH number of about 58 are dehydrated by heating at 130° C. for about 2 hours. The dehydrated polyester is reacted under substantially anhydrous conditions with about 275 grams of p-phenylene diisocyanate at about 115° C. for about 15 minutes. The resulting prepolymer has terminal groups which are predominately isocyanate groups. After cooling to about 80° C., it is mixed with about 48 cubic centimeters of a mixture of about 80 parts by volume of the sodium salt of sulfonated castor oil (water content 54%), about 20 parts by volume of trimethylolpropane and about 0.5 part by volume of hexahydrodimethyl aniline. Mixing is performed at about 50° C. in a double screw extruder. The mixture is then transferred to an open mold before any substantial amount of chemical reaction. In the mold, a rubber-like polyurethane with fine pores is obtained having the following properties:

| | | |
|---|---|---|
| Density | kg./m.$^3$ | 82 |
| Resiliency | percent | 44 |
| Tensile strength | kg./cm.$^2$ | 4.67 |
| Elongation at break | percent | 453 |
| Tear strength | kg./cm | 2.89 |

It is to be understood that any suitable organic polyisocyanate, organic compound having reactive hydrogen atoms and cross-linking agent may be substituted for those in the foregoing examples. Examples of these materials suitable for this purpose are found in the aforesaid patents. Moreover, it is to be understood that variations are permissible in the temperatures and processing steps in-so-long as the product obtained has the required physical characteristics.

As indicated hereinbefore, the molecular weight of the organic compound having reactive hydrogen atoms which is reacted with the organic polyisocyanate in the preparation of the polyurethane should be at least about 750. Although the chemistry involved in the preparation of the polyurethane is not specifically involved in this invention because any polyurethane having the required physical characteristics may be used to form the coupling device, it is considered advisable to point out that the polyester may be prepared by esterification of any suitable polycarboxylic acid, such as, for example, adipic acid, succinic acid, and the like. A desirable polyalkylene ether glycol may be prepared by the condensation of a lower alkenyl oxide, such as, for example, ethylene oxide, propylene oxide, butylene oxide, and the like.

Although the invention has been described in considerable detail in the foregoing for the purpose of illustration, it is to be understood that such detail is solely for this purpose and that variations can be made by those skilled in the art without departing from the spirit and scope of the invention except as is set forth in the claims.

What is claimed is:

1. A moupling device comprising two spaced-apart metal supports each of which are provided with a cage-like structure, and a unitary polyurethane plastic body positioned therebetween, said unitary polyurethane plastic body comprising three distinct portions comprising a central flexible porous polyurethane portion and two non-porous polyurethane end portions securely anchored in said cage-like structure.

2. A coupling device comprising two spaced-apart metal supports each of which are provided with a cage-like structure, and a unitary polyurethane plastic body positioned therebetween, said unitary polyurethane plastic body comprising three distinct portions comprising a central flexible portion and two end portions securely anchored in said cage-like structure, said central flexible portion comprising a porous polyurethane plastic having a density of from about 80 kilograms per cubic meter to about 600 kilograms per cubic meter and a resiliency of from about 40 to about 65%, and said end portions comprising a nonporous polyurethane plastic having a Shore A hardness of from about 60° to about 90° and an elasticity of from about 30% to about 60%.

3. A coupling device comprising a unitary flexible polyurethane body and two spaced-apart metal supports securely anchoring the end portions of said unitary flexible polyurethane body, the metal supports comprising a base plate and a U-shaped member having a perforated base securely affixed to said base plate in spaced relation.

4. A coupling device comprising a unitary flexible polyurethane body having a central porous portion and two non-porous end portions and two spaced-apart metal supports securely anchoring said end portions of said unitary flexible polyurethane body, the metal supports comprising a U-shaped member containing a centrally disposed integral disc in spaced relation from the base of said U-shaped member.

5. A coupling device comprising a unitary flexible polyurethane body, said flexible body including a central portion and two end portions, two spaced apart metal supports each including a base plate and a means attached to the periphery of said base plate securely anchoring said end portions of said flexible body to said supports.

6. A coupling device comprising a unitary flexible polyurethane body, said flexible body including a central porous polyurethane portion and two non-porous polyurethane end portions, two spaced apart metal supports each including a base plate and a means attached to the periphery of said base plate securely anchoring said end portions of said flexible body to said supports.

7. A coupling device comprising a unitary flexible polyurethane body having a central porous portion and two non-porous end portions, two spaced apart metal supports securely anchoring said end portions of said unitary flexible polyurethane body, the metal supports comprising a base plate and a U-shaped member having a perforated base securely affixed to said base plate in spaced relation.

8. A coupling device comprising a unitary flexible polyurethane body having a central porous portion and two non-porous end portions, two spaced apart metal supports securely anchoring said end portions of said unitary flexible polyurethane body, the metal supports comprising a U-shaped member having inwardly disposed indentations in the sides thereof.

References Cited in the file of this patent

UNITED STATES PATENTS

| | | |
|---|---|---|
| 2,170,627 | Berryman | Aug. 22, 1939 |
| 2,241,026 | Wylie | May 6, 1941 |
| 2,844,948 | Jarvis | July 29, 1958 |
| 2,864,338 | Zimmermann | Dec. 16, 1958 |